(12) United States Patent
Maseki et al.

(10) Patent No.: US 9,857,790 B2
(45) Date of Patent: Jan. 2, 2018

(54) NC PROGRAM CREATING DEVICE

(71) Applicant: JTEKT CORPORATION, Osaka-shi (JP)

(72) Inventors: Katsuhiro Maseki, Nagoya (JP); Tatsuhiko Inagaki, Ichinomiya (JP); Hiroyuki Tsusaka, Nagoya (JP); Kazuhiro Tsujimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 302 days.

(21) Appl. No.: 14/644,894

(22) Filed: Mar. 11, 2015

(65) Prior Publication Data

US 2015/0261213 A1 Sep. 17, 2015

(30) Foreign Application Priority Data

Mar. 12, 2014 (JP) .................................. 2014-048537

(51) Int. Cl.
*G05B 9/02* (2006.01)
*G05B 19/4155* (2006.01)
*G05B 19/408* (2006.01)

(52) U.S. Cl.
CPC ....... *G05B 19/4155* (2013.01); *G05B 19/408* (2013.01); *G05B 2219/31029* (2013.01);
(Continued)

(58) Field of Classification Search
CPC .............................. G05B 9/4155; G05B 9/408
(Continued)

(56) References Cited

U.S. PATENT DOCUMENTS 4,890,234 A * 12/1989 Tanaka ................. G05B 19/408
318/568.1
5,005,134 A * 4/1991 Nakashima ........ G05B 19/4147
700/168
(Continued)

FOREIGN PATENT DOCUMENTS

EP 1 712 966 A2 10/2006
JP 2008 112217 5/2008
JP 2013 114425 6/2013

OTHER PUBLICATIONS

Extended European Search Report dated Jul. 16, 2015 in Patent Application No. 15158349.9.

*Primary Examiner* — Mohammad Ali
*Assistant Examiner* — Sheela S Rao
(74) *Attorney, Agent, or Firm* — Oblon, McClelland, Maier & Neustadt, L.L.P.

(57) ABSTRACT

An NC program creating device is provided that can automatically insert in an NC program a code that can be executed simultaneously with feeding in a non-cutting state. If it is determined by a determination unit that there is a standard code M03, M06, M10 before or after a non-cutting feed code G00 or G30 in an NC program, a new code placement unit places, instead of the standard code M03, M06, M10, a simultaneous execution code M103, M805, M110 corresponding to the standard code M03, M06, M10 before the non-cutting feed code G00 or G30, and places after the non-cutting feed code G00 or G30 a code that performs at least a prescribed operation of the standard code M03, M06, M10 other than an operation of the simultaneous execution code M103, M805, M110.

8 Claims, 9 Drawing Sheets

(52) U.S. Cl.
CPC ............. *G05B 2219/35245* (2013.01); *G05B 2219/35252* (2013.01)

(58) Field of Classification Search
USPC .......................................................... 700/79
See application file for complete search history.

(56) References Cited

U.S. PATENT DOCUMENTS

| | | | | |
|---|---|---|---|---|
| 5,229,950 | A * | 7/1993 | Niwa | .................... G05B 19/408 |
| | | | | 700/181 |
| 8,041,445 | B2 * | 10/2011 | Suh | .................. G05B 19/40931 |
| | | | | 700/160 |
| 2004/0039476 | A1 * | 2/2004 | Iihoshi | ............... G05B 19/4155 |
| | | | | 700/169 |
| 2006/0253846 | A1 | 11/2006 | Ogata et al. | |
| 2014/0025192 | A1 * | 1/2014 | Seya | .................. G05B 19/4063 |
| | | | | 700/174 |

* cited by examiner

EXECUTION TIME

NC PROGRAM CREATING DEVICE

INCORPORATION BY REFERENCE

The disclosure of Japanese Patent Application No. 2014-048537 filed on Mar. 12, 2014 including the specification, drawings and abstract, is incorporated herein by reference in its entirety.

BACKGROUND OF THE INVENTION

1. Field of the Invention

The invention relates to numerical control (NC) program creating devices.

2. Description of the Related Art

NC programs for operating machine tools are sequential programs. Accordingly, the program proceeds to the subsequent process after one process is completed. For example, in the case of starting cutting after setting the spindle speed to a predetermined command value, a non-cutting feed code G00 for a feed mechanism in a non-cutting state, in which a cutting start position is a command position, is placed after a spindle rotation code M03, and a cutting feed code G01 for the feed mechanism in a cutting state is placed after the non-cutting feed code G00.

An operation of changing tools is performed after a spindle is moved to a prescribed position in the non-cutting state. Accordingly, an automatic tool changer (ATC) code (tool change code) M06 is placed after a non-cutting feed code G30 (or G00). The ATC code is a code for performing a series of operations, namely the operations of opening a shutter of an automatic tool changer, changing tools, and closing the shutter.

In the case of starting cutting after indexing a rotating workpiece mount table (rotary table) to a desired angle, a code for unclamping the rotary table, a code for indexing the rotary table to the desired angle, and a code for clamping the rotary table are sequentially placed in this order, the non-cutting feed code G00 is placed after the code for clamping the rotary table, and the cutting feed code G01 is placed after the non-cutting feed code G00. The NC programs are described in, e.g., Japanese Patent Application Publication Nos. 2008-112217 (JP 2008-112217 A) and 2013-114425 (JP 2013-114425 A).

As described above, the non-cutting feed code is not executed simultaneously with the operation of changing the spindle speed, the series of operations for changing tools, and the operation of clamping the rotary table, but is executed independently before or after the operation of changing the spindle speed, the series of operations for changing tools, and the operation of clamping the rotary table. Namely, the non-cutting feed code and the codes for the operation of changing the spindle speed, the series of operations for changing tools, and the operation of clamping the rotary table are sequentially executed one by one. Accordingly, the machining cycle time can be reduced if at least part of the codes can be executed simultaneously.

SUMMARY OF THE INVENTION

It is an object of the invention to provide an NC program creating device capable of automatically inserting a code that can be executed simultaneously with feeding in a non-cutting state.

According to an aspect of the invention, a device for creating an NC program for a machine tool includes: a storage unit that stores a standard code that performs a prescribed operation and that is restricted from being executed simultaneously with an operation of moving a feed mechanism in a non-cutting state, and a simultaneous execution code that corresponds to the standard code, that performs part of the operation of the standard code, and that is allowed to be executed simultaneously with the operation of moving the feed mechanism in the non-cutting state; a determination unit that determines if there is in the NC program the standard code before or after a non-cutting feed code that starts the operation of moving the feed mechanism in the non-cutting state and that verifies that the feed mechanism has reached a command position; and, a new code placement unit that places, instead of the standard code, the simultaneous execution code corresponding to the standard code before the non-cutting feed code, and places after the non-cutting feed code a code that performs at least the prescribed operation of the standard code other than the operation of the simultaneous execution code, if it is determined by the determination unit that there is the standard code.

Accordingly, the simultaneous execution code can be automatically inserted. Such an NC program is thus automatically created, which reduces the time required to create the NC program and reduces machining cycle time.

A preferred form of the NC program creating device according to the above aspect will be described below. The NC program creating device according to the above aspect is not limited to the preferred form described below.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is an NC program before editing, NC program being input to the determination unit in FIG. 2;

FIG. 4 is an NC program edited (created) by the process of FIG. 2;

DETAILED DESCRIPTION OF EMBODIMENTS

Figure 1:
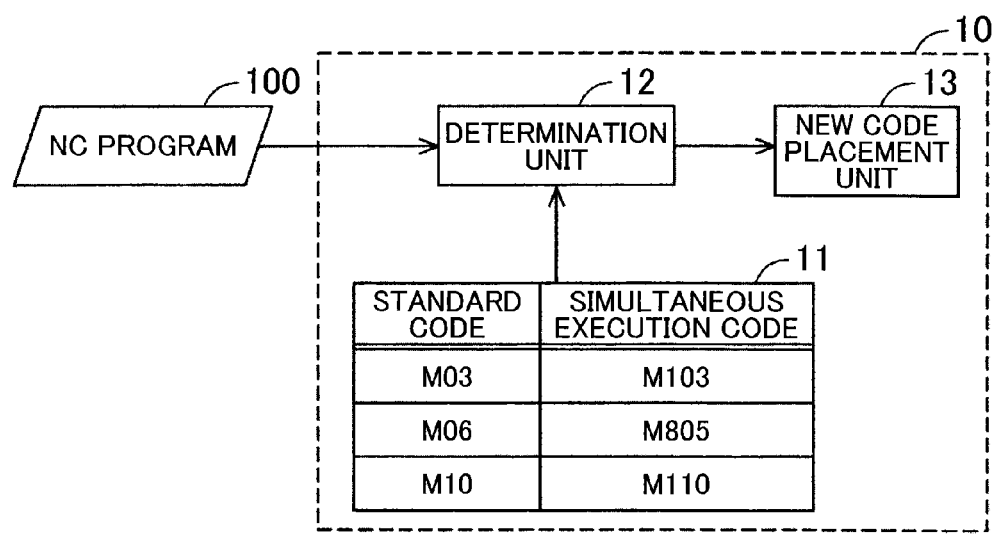
FIG. 1 is a block diagram of an NC program creating device according to an embodiment of the invention.

An NC program creating device 10 according to an embodiment of the invention will be described with reference to the accompanying drawings. The NC program creating device 10 is a device that creates an NC program for a machine tool. As shown in FIG. 1, the NC program creating device 10 is a device that receives an NC program 100 created in advance and edits the NC program 100. The NC program creating device 10 includes a storage unit 11, a determination unit 12, and a new code placement unit 13. The NC program creating device 10 is implemented by hardware comprised of a central processing unit (CPU) and a memory, an input device, a display, etc., and software of procedures for various kinds of arithmetic processing.

As shown in FIG. 1, the storage unit 11 stores a plurality of standard codes, and a plurality of simultaneous execution codes respectively corresponding to the standard codes. The standard code is a code for performing a prescribed operation, and is a code that is restricted from being executed simultaneously with feeding in a non-cutting state. Examples of the standard codes include M03, M06, and M10. The simultaneous execution codes will be described later.

M03 is a spindle rotation code for starting an operation of changing the spindle speed and that verifies that the spindle speed has reached a command value. M06 is an ATC code for sequentially performing operations of opening a shutter of an automatic tool changer, changing tools, and closing the shutter. M10 is a clamp code for starting an operation of clamping a rotary table that is unclamped from a support mechanism for the rotary table and for verifying that the rotary table has been clamped.

The simultaneous execution code is a code for performing part of operations of its corresponding standard code, and a code that is allowed to be executed simultaneously with feeding in the non-cutting state. The simultaneous execution codes corresponding to the standard codes M03, M06, and M10 are respectively M103, M805, and M110.

M103 corresponds to the spindle rotation code M03. M103 is a spindle rotation start code for starting the operation of changing the spindle speed. M805 corresponds to the ATC code M06. M805 is a shutter open code for performing the operation of opening the shutter. M110 corresponds to the clamp code M10. M110 is a clamp start code for starting the operation of clamping the rotary table.

As used herein, the "cutting feed code" refers to a code for starting an operation of moving a feed mechanism in a cutting state and for verifying that the feed mechanism has reached a command position. Examples of the cutting feed code include G01, G02, and G03. The "non-cutting feed code" refers to a code for starting an operation of moving the feed mechanism in the non-cutting state and for verifying that the feed mechanism has reached a command position. Examples of the non-cutting feed code include G00 and G30.

The determination unit 12 determines if there is any standard code before or after the non-cutting feed code in the received NC program 100. As used herein, the expression "before or after the non-cutting feed code" means one or more blocks before the block having the non-cutting feed code or one or more blocks after the block having the non-cutting feed code.

If it is determined by the determination unit 12 that there is a standard code, the new code placement unit 13 places, instead of the standard code, a simultaneous execution code corresponding to the standard code before the non-cutting feed code, and places the standard code after the non-cutting feed code.

A first process that is performed by the determination unit 12 and the new code placement unit 13 regarding M03 as one of the standard codes will be described with reference to FIGS. 2 to 6. As shown in S1 of FIG. 2, the NC program 100 is first input to the determination unit 12. Next, the determination unit 12 detects the position of the spindle rotation code M03 in the NC program 100 (S2). The determination unit 12 then determines if M03 is located before the non-cutting feed code G00 or G30 (S3).

If it is determined by the determination unit 12 that M03 is located before G00 or G30 (S3: Yes), the new code placement unit 13 then deletes M03 and inserts (places) the spindle rotation start code M103 at the position where M03 is used to be located (S4). That is, the new code placement unit 13 replaces M03 with M103. Thereafter, the new code placement unit 13 inserts between G00 and the cutting feed code G01 or between G30 and G01 a code for verifying that the spindle speed has reached a command value (S6), and the process is terminated. Either the spindle rotation code M03 or a special code other than M03 can be used as the code for verifying that the spindle speed has reached the command value. In the present embodiment, M03 is used as this code.

If it is determined by the determination unit 12 that M03 is not located before G00 or G30 (S3: No), the new code placement unit 13 inserts M103 before G00 or G30 (S05), and the process is terminated. That is, the new code placement unit 13 keeps M03 at its initial position. In this case, M03 therefore functions as a code for verifying that the spindle speed has reached the command value. In addition to this processing method, the new code placement unit 13 may replace M03 that is located after G00 or G30 with the special code for verifying that the spindle speed has reached the command value.

Figure 2:
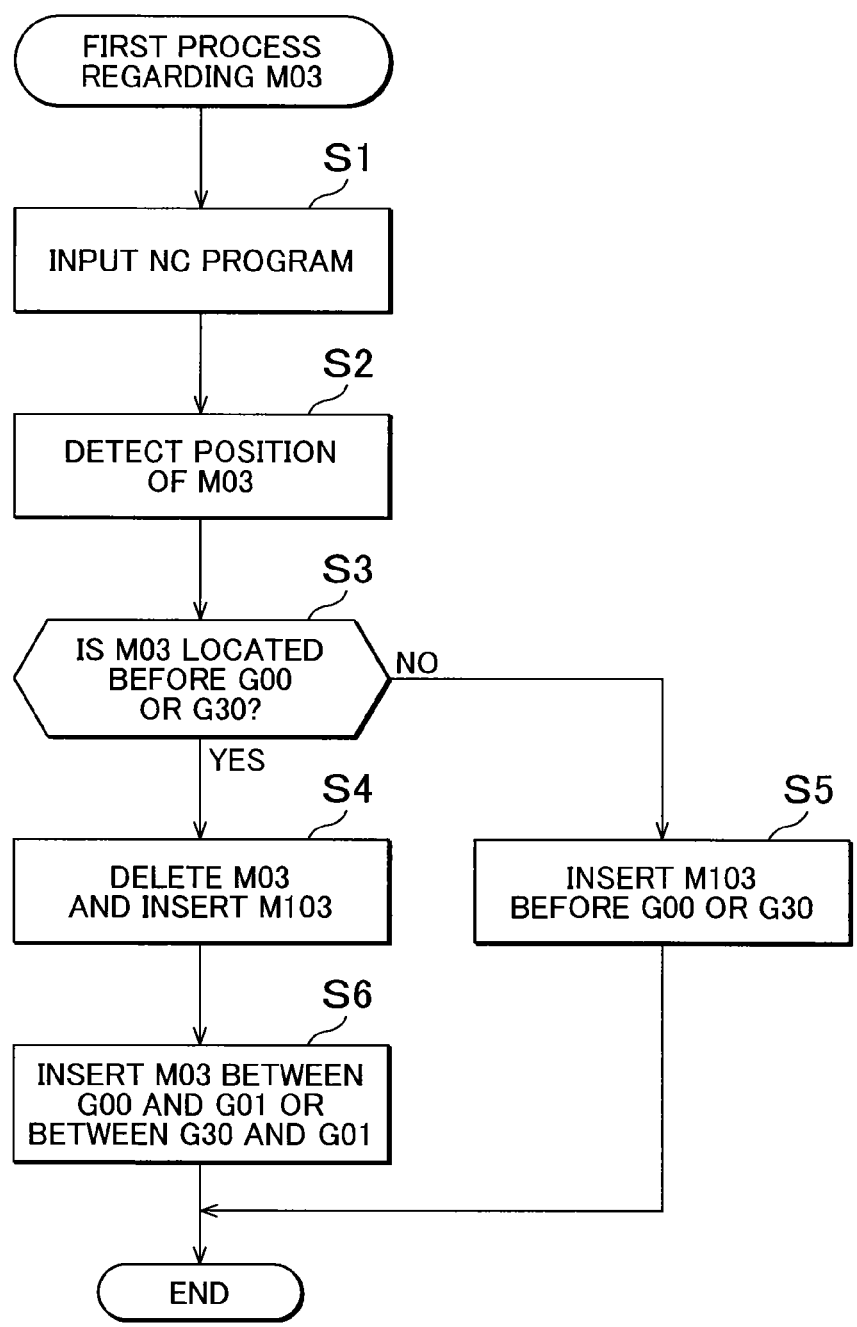
FIG. 2 is a flowchart illustrating a first process by a determination unit and a new code placement unit in FIG. 1 regarding M03.
Figures 5, 6:
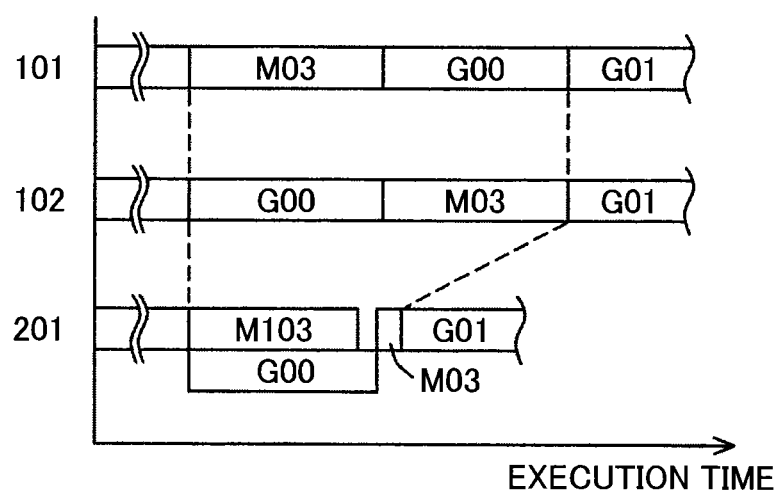
FIG. 5 is another NC program before editing, NC program being input to the determination unit in FIG. 2.
FIG. 6 shows the difference in execution time between the NC programs before editing shown in FIGS. 3 and 5 and the edited NC program shown in FIG. 4.

In the case where an NC program 101 shown in FIG. 3 is input to the determination unit 12, an NC program 201 shown in FIG. 4 is created by the process shown in FIG. 2. In this case, S4 and S6 are performed after S3 in FIG. 2. The NC program 201 shown in FIG. 4 is also created in the case where an NC program 102 shown in FIG. 5 is input to the determination unit 12. In this case, S5 is performed after S3 in FIG. 2.

As shown in FIG. 3, in the first NC program 101 before editing, the operation of moving the feed mechanism in the non-cutting state is started by the non-cutting feed code G00 after the operation of changing the spindle speed is started and it is verified that the spindle speed has reached the command value by the spindle rotation code M03 (see A in FIG. 3). Moreover, in the first NC program 101 before editing, it is verified by the non-cutting feed code G00 that the feed mechanism has reached the command position, and subsequently the operation of moving the feed mechanism in the cutting state is started by the cutting feed code G01.

As shown in FIG. 5, in the second NC program 102 before editing, the operation of changing the spindle speed is started by the spindle rotation code M03 (see A in FIG. 5) after the operation of moving the feed mechanism in the non-cutting state is started and it is verified that the feed mechanism has reached the command position by the non-cutting feed code G00. Moreover, in the second NC program 102 before editing, it is verified by the spindle rotation code M03 that the spindle speed has reached the command value, and subsequently the operation of moving the feed mechanism in the cutting state is started by the cutting feed code G01.

As shown in FIG. 4, in the edited NC program 201, the operation of changing the spindle speed is started by the spindle rotation start code M103 (see A1 in FIG. 4), and at the same time the operation of moving the feed mechanism in the non-cutting state is started by the non-cutting feed code G00. That is, the operation of changing the spindle speed and the operation of moving the feed mechanism in the non-cutting state are performed at the same time. Subsequently, after one of these operations which takes longer time is finished, the spindle rotation code M03 is executed (see A2 in FIG. 4). In this case, the spindle rotation code M03 functions as a code for performing the operations of the spindle rotation code M03 other than the operation of the spindle rotation start code M103. That is, the spindle rotation code M03 functions as a code for verifying that the spindle speed has reached the command value. In the edited NC program 201, the operation of moving the feed mechanism in the cutting state is then started by the cutting feed code G01.

As shown in FIG. 6, comparison of execution time between the NC programs 101, 102 before editing and the edited NC program 201 shows that the execution time of the edited NC program 201 is shorter than that of the NC programs 101, 102 before editing. This is because the edited NC program 201 executes M103 and G00 simultaneously. The NC program creating device of the present embodiment can automatically place the simultaneous execution code. The NC program 201 capable of reducing the machining cycle time is therefore automatically created. This reduces the time required to create the NC program 201 and reduces the machining cycle time.

Figure 7:
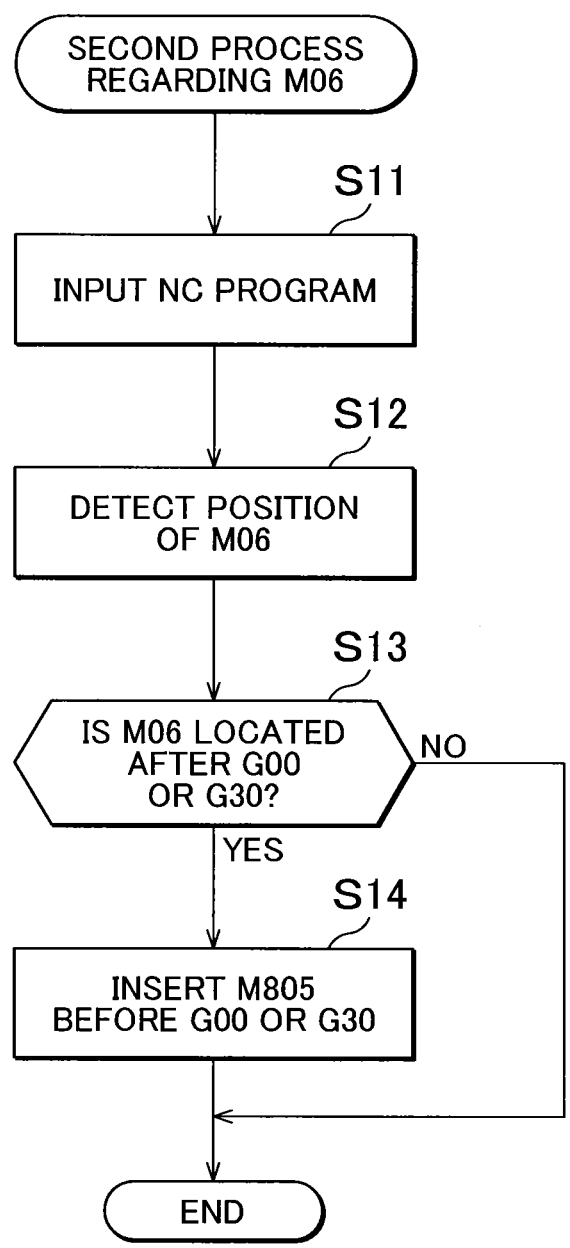
FIG. 7 is a flowchart illustrating a second process by the determination unit and the new code placement unit in FIG. 1 regarding M06.

A second process that is performed by the determination unit 12 and the new code placement unit 13 regarding M06 as one of the standard codes will be described below with reference to FIGS. 7 to 9. As shown in FIG. 7, the NC program 100 is first input to the determination unit 12 (S11). Next, the determination unit 12 detects the position of the ATC code M06 in the NC program 100 (S12). The determination unit 12 then determines if M06 is located after the non-cutting feed code G00 or G30 (S13).

If it is determined by the determination unit 12 that M06 is located after G00 or G30 (S13: Yes), the new code placement unit 13 then inserts the shutter open code M805 before G00 or G30 (S14), and the process is terminated. That is, the new code placement unit 13 keeps M06 at its initial position. After the insertion of M805, M06 functions as a code for performing the operations of M06 other than the operation of M805. That is, M06 functions as a code for sequentially performing the operations of changing tools and closing the shutter. Alternatively, the new code placement unit 13 may replace M06 with a special code for sequentially performing the operations of changing tools and closing the shutter. If it is determined by the determination unit 12 that M06 is not located after G00 or G30 (S13: No), the new code placement unit 13 does not do anything, and the process is terminated.

Figure 8:
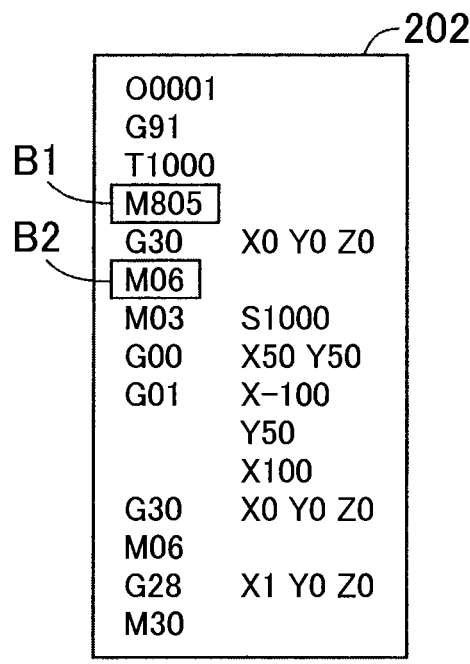
FIG. 8 is an NC program edited (created) by the process of FIG. 7.

In the case where the NC program 101 shown in FIG. 3 is input to the determination unit 12, an NC program 202 shown in FIG. 8 is created by the process shown in FIG. 7. As shown in FIG. 3, in the first NC program 101 before editing, the operation of moving the feed mechanism in the non-cutting state is started and it is verified that the feed mechanism has reached a tool change position (command origin) by the non-cutting feed code G30, and subsequently the operations of opening the shutter, changing tools, and closing the shutter are sequentially performed by the ATC code M06 (see B in FIG. 3).

In the edited NC program 202 shown in FIG. 8, the operation of opening the shutter is started by the shutter open code M805 (see B1 in FIG. 8), and at the same time the operation of moving the feed mechanism is started by the non-cutting feed code G30. That is, of the series of operations for changing tools, the operation of opening the shutter and the operation of moving the feed mechanism in the non-cutting state are performed at the same time. Subsequently, after one of these operations which takes longer time is finished, the ATC code M06 is executed (see B2 in FIG. 8). In this case, since the operation of opening the shutter has already been performed, the ATC code M06 functions as a code for performing the operations of M06 other than the operation of opening the shutter. That is, the ATC code M06 functions as a code for performing the operations of changing tools and closing the shutter.

Figure 9:
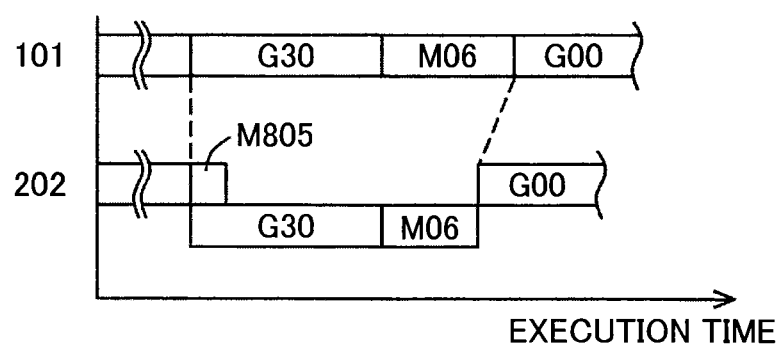
FIG. 9 shows the difference in execution time between the NC program before editing shown in FIG. 3 and the edited NC program shown in FIG. 8.

As shown in FIG. 9, comparison of execution time between the NC program 101 before editing and the edited NC program 202 shows that the execution time of the edited NC program 202 is shorter than that of the NC program 101 before editing. This is because the edited NC program 202 executes M805 (performing part of the operations of M06) and G30 simultaneously. The NC program creating device of the present embodiment can automatically place the simultaneous execution code. The NC program 202 capable of reducing the machining cycle time is therefore automatically created. This reduces the time required to create the NC program 202 and reduces the machining cycle time.

Figure 10:
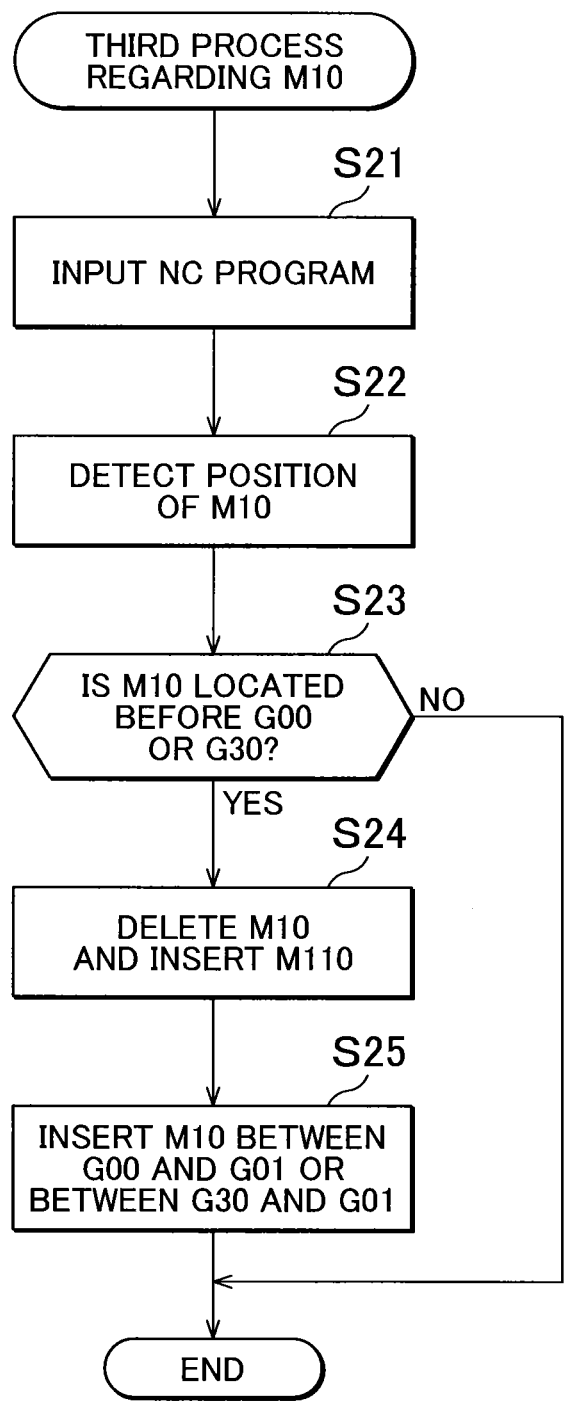
FIG. 10 is a flowchart illustrating a third process by the determination unit and the new code placement unit in FIG. 1 regarding M10.

A third process that is performed by the determination unit 12 and the new code placement unit 13 regarding M10 as one of the standard codes will be described below with reference to FIGS. 10 to 13. As shown in FIG. 10, the NC program 100 is first input to the determination unit 12 (S21). Next, the determination unit 12 detects the position of the clamp code M10 for the rotary table in the NC program 100 (S22). The determination unit 12 then determines if M10 is located before the non-cutting feed code G00 or G30 for changing a Cartesian coordinate value as XYZ coordinate values (S23). The non-cutting feed code G00 or G30 for changing the Cartesian coordinate value does not include the non-cutting feed code G00 for indexing the rotary table to a desired angle.

If it is determined by the determination unit 12 that M10 is located before G00 or G30 (S23: Yes), the new code placement unit 13 then deletes M10 and inserts the clamp start code M110 at the position where M10 is used to be located (S24). That is, the new code placement unit 13 replaces M10 with M110. Thereafter, the new code placement unit 13 inserts between G00 and the cutting feed code G01 or between G30 and G01 a code for performing at least the operations of the clamp code M10 other than the operation of the clamp start code M110 (S25), and the process is terminated.

Either M10 or a special code other than M10 may be used as the code for performing at least the prescribed operations of the clamp code M10 other than the operation of the clamp start code M110. In the present embodiment, M10 is used as this code. If it is determined by the determination unit 12 that M10 is not located before G00 or G30 (S23: No), the process is terminated.

Figure 11:
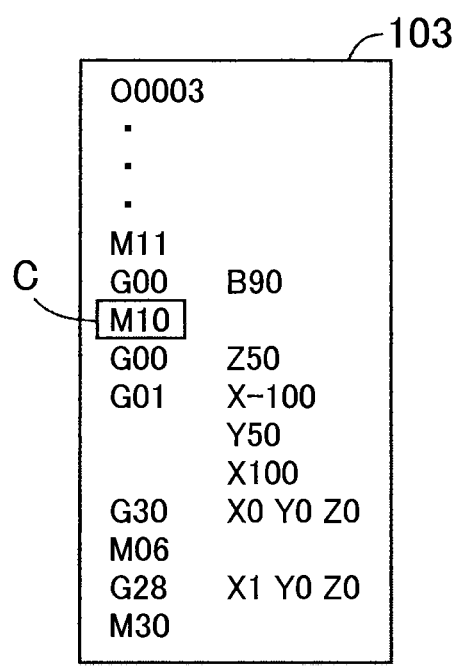
FIG. 11 is an NC program before editing, NC program being input to the determination unit in FIG. 10.

As shown in FIG. 11, in an NC program 103 before editing, an operation of unclamping the rotary table is performed by an unclamp code M11, and subsequently the operation of indexing the rotary table to a desired angle is performed by the non-cutting feed code G00. After the indexing of the rotary table is completed, the operation of clamping the rotary table is performed by the clamp code M10, and the operation of moving the feed mechanism in the non-cutting state is started by the non-cutting feed code G00. Thereafter, it is verified by the non-cutting feed code G00 that the feed mechanism has reached the command position, and subsequently the operation of moving the feed mechanism in the cutting state is started by the cutting feed code G01.

Figure 12:
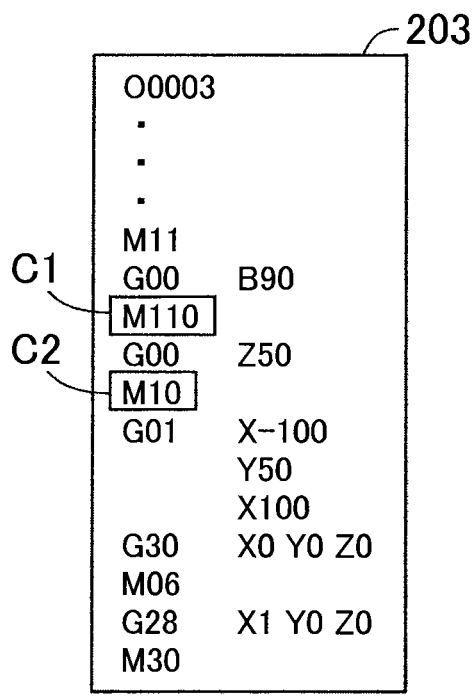
FIG. 12 is an NC program edited (created) by the process of FIG. 10.

As shown in FIG. 12, in an edited NC program 203, after the indexing of the rotary table to the desired angle is completed, the operation of clamping the rotary table is started by the clamp start code M110 (see C1 in FIG. 12), and at the same time the operation of moving the feed mechanism in the non-cutting state is started by the non-cutting feed code G00. That is, of the series of operations for indexing the rotary table to the desired angle, the operation of clamping the rotary table and the operation of moving the feed mechanism in the non-cutting state are performed at the same time. Subsequently, after one of these operations which takes longer time is finished, the clamp code M10 is executed (see C2 in FIG. 12). In this case, the clamp code M10 functions as a code for performing the operations of the clamp code M10 other than the operation of the clamp start code M110. That is, the clamp code M10 functions as a code for verifying that the rotary table has been clamped. In the edited NC program 203, the operation of moving the feed mechanism in the cutting state is then started by the cutting feed code G01.

Figure 13:
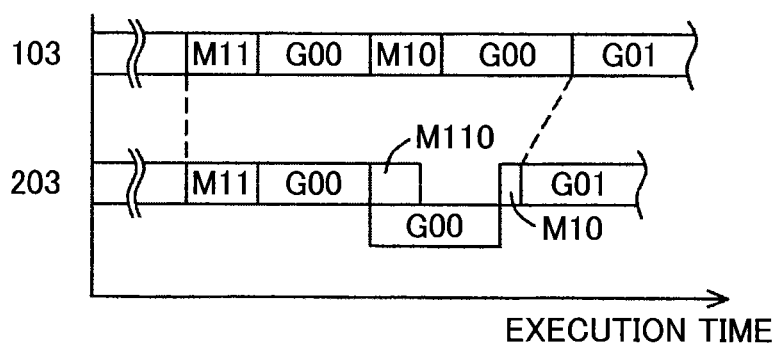
FIG. 13 shows the difference in execution time between the NC program before editing shown in FIG. 11 and the edited NC program shown in FIG. 12.

As shown in FIG. 13, comparison of execution time between the NC program 103 before editing and the edited NC program 203 shows that the execution time of the edited NC program 203 is shorter than that of the NC program 103 before editing. This is because the edited NC program 203 executes M110 and G00 simultaneously. The NC program creating device of the present embodiment can automatically place the simultaneous execution code. The NC program 203 capable of reducing the machining cycle time is therefore automatically created. This reduces the time required to create the NC program 203 and reduces the machining cycle time.

The first to third processes are performed separately in the above embodiment. However, these processes may be performed in combination. In this case, for example, if the determination unit 12 and the new code placement unit 13 perform the first process and the third process on the NC program 101 before editing (shown in FIG. 3), the spindle rotation start code M103 and the shutter open code M805 are inserted at appropriate positions in the edited NC program.

In the above embodiment, a code that is allowed to be executed simultaneously with feeding in the non-cutting state is automatically inserted. It can be selected by interactive programming to automatically insert a code. Entering choice and data by the operator via a menu and items displayed on the screen eliminates the need for the operator to read a program and manually correct the program, thereby making it easier to create an NC program. That is, a desired NC program is created in view of the operator's intention.

What is claimed is:

1. A device for creating a numerical control (NC) program for use to control a machine tool, the device comprising:
a memory that
stores a standard code that performs a prescribed operation and that is restricted from being executed simultaneously with an operation of moving a feed mechanism in a non-cutting state; and
stores a simultaneous execution code that corresponds to the standard code, that performs part of the operation of the standard code, and that is allowed to be executed simultaneously with the operation of moving the feed mechanism in the non-cutting state; and
processing circuitry that
determines whether the standard code is in the NC program before or after a non-cutting feed code that starts the operation of moving the feed mechanism in the non-cutting state and that verifies that the feed mechanism has reached a command position;
places, instead of the standard code, the simultaneous execution code before the non-cutting feed code; and
places a code, after the non-cutting feed code, that performs at least the prescribed operation of the standard code other than the operation of the simultaneous execution code when the processing circuitry determines that there is the standard code, wherein the standard code includes a spindle rotation code that starts an operation of changing a spindle speed and that verifies that the spindle speed has reached a command value, the simultaneous execution code corresponds to the spindle rotation code and the simultaneous execution code includes a spindle rotation start code that starts the operation of changing the spindle speed,
the code verifies that the spindle speed has reached the command value, when the spindle rotation code is located before the non-cutting feed code, the processing circuitry
deletes the spindle rotation code,
inserts the spindle rotation start code before the non-cutting feed code, and inserts the code at a position located after the non-cutting feed code and before a cutting feed code, and
the NC program is used to control the machine tool.

2. The device for creating an NC program for a machine tool according to claim 1, wherein
when the spindle rotation code is located after the non-cutting feed code and the spindle rotation code is located before a cutting feed code, the processing circuitry inserts the spindle rotation start code before the non-cutting feed code.

3. The device for creating an NC program for a machine tool according to claim 2, wherein the processing circuitry deletes, places, or inserts the code when interactive programming selects to delete, or place, or insert the code.

4. A device for creating a numerical control (NC) program for use to control a machine tool, the device comprising:
a memory that
stores a standard code that performs a prescribed operation and that is restricted from being executed simultaneously with an operation of moving a feed mechanism in a non-cutting state; and
stores a simultaneous execution code that corresponds to the standard code, that performs part of the operation of the standard code, and that is allowed to be executed simultaneously with the operation of moving the feed mechanism in the non-cutting state; and
processing circuitry that
determines whether the standard code is in the NC program before or after a non-cutting feed code that starts the operation of moving the feed mechanism in the non-cutting state and that verifies that the feed mechanism has reached a command position;

places, instead of the standard code, the simultaneous execution code before the non-cutting feed code; and places a code, after the non-cutting feed code, that performs at least the prescribed operation of the standard code other than the operation of the simultaneous execution code when the processing circuitry determines that there is the standard code, wherein the standard code includes an automatic tool changer (ATC) code that sequentially performs operations of opening a shutter, changing tools, and closing the shutter, the simultaneous execution code corresponds to the ATC code and the simultaneous execution code is a shutter open code that performs the operation of opening the shutter, when the ATC code is located after the non-cutting feed code, the processing circuitry inserts the shutter open code before the non-cutting feed code, and the NC program is used to control the machine tool.

5. The device for creating an NC program for a machine tool according to claim 1, wherein the processing circuitry deletes, places, or inserts the code when interactive programming selects to delete, or place, or insert the code.

6. A device for creating a numerical control (NC) program for use to control a machine tool, the device comprising: wherein a memory that
stores a standard code that performs a prescribed operation and that is restricted from being executed simultaneously with an operation of moving a feed mechanism in a non-cutting state; and
stores a simultaneous execution code that corresponds to the standard code, that performs part of the operation of the standard code, and that is allowed to be executed simultaneously with the operation of moving the feed mechanism in the non-cutting state; and processing circuitry that
determines whether the standard code is in the NC program before or after a non-cutting feed code that starts the operation of moving the feed mechanism in the non-cutting state and that verifies that the feed mechanism has reached a command position;

places, instead of the standard code, the simultaneous execution code before the non-cutting feed code; and places a code, after the non-cutting feed code, that performs at least the prescribed operation of the standard code other than the operation of the simultaneous execution code when the processing circuitry determines that there is the standard code, the standard code includes a clamp code that starts an operation of clamping a rotary table that is unclamped from a support mechanism for the rotary table and that verifies that the rotary table has been clamped, the simultaneous execution code corresponds to the clamp code and the simultaneous execution code is a clamp start code that starts the operation of clamping the rotary table, the code performs at least the prescribed operation of the clamp code other than the operation of the clamp start code, when the clamp code is located before the non-cutting feed code, the processing circuitry deletes the clamp code, inserts the clamp start code before the non-cutting feed code, and inserts the code at a position located atler the non-cutting feed code and before a cutting feed code, and the NC program is used to control the machine tool.

7. The device for creating an NC program for a machine tool according to claim 6, wherein the processing circuitry deletes, places, or inserts the code when interactive programming selects to delete, or place, or insert the code.

8. The device for creating an NC program for a machine tool according to claim 1, wherein the processing circuitry deletes, places, or inserts the code when interactive programming selects to delete, or place, or insert the code.

* * * * *